United States Patent [19]
Godai et al.

[11] 3,853,611
[45] Dec. 10, 1974

[54] WELDING MATERIAL FOR SUPER LOW TEMPERATURE STEELS

[75] Inventors: Tomokazu Godai; Tohoru Sugiyama; Katushi Nishimura, all of Kamakura, Japan

[73] Assignee: Kobe Steel, Ltd., Kobe, Japan

[22] Filed: Apr. 7, 1972

[21] Appl. No.: 242,202

[30] Foreign Application Priority Data
Apr. 10, 1971 Japan.............................. 46-22530

[52] U.S. Cl................ 117/205, 29/191.2, 29/191.6, 75/170, 75/171, 117/206, 148/24, 148/26, 219/137, 219/145, 219/146
[51] Int. Cl....................... B23k 35/30, B23k 35/36
[58] Field of Search................ 29/191.6, 191.2, 193; 117/202, 203, 205, 206; 75/171, 170; 219/136, 137, 145, 146; 148/23, 24, 26

[56] References Cited
UNITED STATES PATENTS
3,024,137   3/1962   Witherell............................ 117/206

*Primary Examiner*—R. Dean
*Attorney, Agent, or Firm*—Oblon, Fisher, Spivak, McClelland & Maier

[57] ABSTRACT

This invention provides a welding material for super low temperature steels which comprises not more than 0.2% carbon, 5 – 12% manganese, not more than 30% chromium, 4 – 8% niobium, 22% iron and not more than 1.5% silicon, the balance being substantially nickel, and which can give excellent strength and impact value to the weld zone. In one embodiment, the welding material is an integral body composed of a metal-forming material and a flux of lime or lime-titania in which the metal forming components are within the above range.

2 Claims, No Drawings

WELDING MATERIAL FOR SUPER LOW TEMPERATURE STEELS

BACKGROUND OF THE INVENTION

1. Field of The Invention

This invention relates to a nickel-base alloy welding material for use in welding of steels which are intended to be subjected to super low temperature.

2. Description of Prior Art

Nine percent nickel steels are frequently used as lining materials for vessels for transporting super low temperature liquids, such as liquefied nitrogen, liquefied oxygen and liquefied natural gas. They are also used in the construction of equipment used for processing or storing super low temperature liquids. According to ASTM standards, 9% nickel steels are classified into A 353-65T (NNT steel) and A 553-65T (QT steel), and their properties are standardized. According to this standard, each of these types must have a tensile strength of 70.3 – 84.4 Kg/mm$^2$, and the yield point (0.2% proof stress) for the NNT steel must be above 52.7 Kg/mm$^2$, and for the QT steel must be above 59.8 Kg/mm$^2$. The low temperature toughness at −196°C. must exceed 3.5 Kg-m.

Nickel steels of 5.5% have also become commercially available, but so far there has been no standardization of such material. The strength and low temperature toughness of such materials, however, are almost equal to those of 9% nickel steel.

It has been considered to use so-called eutectoid materials for 9% nickel steel and nickel-base alloys as the welding materials for the above mentioned low temperature steels.

The eutecoid welding materials are of the same composition as that of the base metal and are characterized by a tensile strength and a yield point equal to those of 9% nickel steels. However, since the low temperature toughness at −196° C. in the as-welded state, of these eutectoid materials, is inferior to that of the base metal, they have not been widely used.

Although nickel-base alloy welding materials are insufficient from the point of view of tensile strength (60 – 65 Kg/mm$^2$) and yield point (0.2% proof strength) and 36 – 40 Kg/mm$^2$, respectively, for the deposited metal, each of which is lower than the corresponding property of the base metal, its low temperature toughness in the as-welded state is stable and excellent, and it has been primarily used for low temperature applications.

Welding materials of this type are classified as AWS A5.11 ENi-Cr-Fe 1 to 3 and include so-called inconel alloys of 75Ni-15Cr series and alloys of 50Ni-15Cr and 35Ni-15Cr series, etc.

Since in such welding material a higher nickel content results in a high strength and a more stable impact resistance, the inconel alloys frequently find the greatest range of use.

ASTM standard 1308-5 specifies the properties required of the weld zone so far as when stress relief annealing is not conducted in the manufacture of pressure vessels by welding of super low temperature steels, and this standard is usually adopted in this field. This standard provides the requirements of joint tensile strength. Even though inconel alloys provide lower strengths of the whole deposited metal than 9% nickel steels, they can nevertheless fully meet the requirements specified by ASTM 1308-5. In other words, any material that can provide a whole deposited metal strength of about 60 to 65 Kg/mm$^2$ can meet the standards of ASTM 1308-5, which means that this standard has been determined by recognition of the fact that the strength of the weld zone may be lower than that of the base metal. In designing pressure vessels according to this standard, the lower strength weld zone must be considered, which results in a greater thickness of construction than would be required if the weld zone were of equal strength.

SUMMARY OF THE INVENTION

Accordingly, a primary object of this invention is to provide a nickel-base alloy welding material which is free of the above-mentioned defects of conventional welding materials and which can give excellent strength and impact value characteristics to the weld zone in welding of super low temperature steels.

Another object of this invention is to impart good workability to a high-manganese nickel-base alloy type welding rod.

These and other objects as will hereinafter become more readily apparent, have been attained by the present invention which provides a welding material for super low temperature steels comprising not more than 0.2% carbon, 5 – 12% manganese, not more than 30% chromium, 4 – 8% niobium, not more than 22% iron and not more than 1.5% silicon, the balance being substantially nickel.

In another aspect, this invention provides a welding material for super low temperature steels, which is formed by integrally combining a metal-forming material having the above composition with a flux of the lime or lime-titania type.

In still another aspect, this invention provides a welding material for super low temperature steels, which is formed by integrally combining a metal-forming material with a flux of the lime or lime-titania type in which the metal forming components are within the above range.

DETAILED DESCRIPTION OF THE INVENTION

The welding material of this invention can be used with any known welding method, such as manual welding, TIG welding, MIG welding or submerged arc welding. By the term "welding material formed by integrally combining a metal-forming material with a flux" used in the instant specification is meant a coated electrode for arc welding, composed of a core wire covered with a flux; a composite wire composed of a metal casting packed with alloy powder optionally together with a flux; or the like.

The nickel-base welding material of this invention has a composition comprising, on the weight basis, not more than 0.2% carbon, not more than 12% manganese, not more than 30% chromium, not more than 8% niobium and not more than 22% iron, the balance being substantially nickel, and it can be prepared by any conventional method. In addition to the above elements, the welding material of this invention generally comprises silicon as a deoxidizing element and phosphorus and sulfur as impurities. However, since these elements can adversely affect the crack resistance of the deposited metal, better results are obtained by reducing the silicon content to below 1.5% and the contents of phosphorus and sulfur to below 0.1%.

The composition of the deposited metal formed by using the above core wire, can be calculated based on an assumption that the ratios of carbon, manganese, chromium, niobium, iron and silicon transferred from the core wire into the deposited metal, are 100%, 90%, 90%, 90%, 90%, and 60%, respectively.

A preferable coating material is one that can improve the ratios of alloy-constituting elements transferred into the deposited metal and can reduce the generation of hydrogen. This object can be attained by the use of flux having the composition of ordinary lime or lime-titania, in which a deoxidizing agent is present in an amount of up to 60%, and in which an alloy is incorporated in the form of a metal powder.

If the chemical composition of the nickel-base core wire is such that the above-described deposited metal composition specified would not ordinarily have been obtained, it is nevertheless possible to obtain these ratios by adding to the flux, as alloy-constituting elements, not more than 1.6% carbon, not more than 55% manganese, not more than 60% chromium, not more than 24% niobium and not more than 10% silicon, with the proviso that the total amount of these metals does not exceed 60%.

The above upper limits of each of the alloy-constituting elements incorporated in the flux have been determined on the basis that the total deposited metal will have the above-mentioned composition in an integral body composed of a nickel-base core wire having a relatively thin coating, i.e., a welding rod composed of a core wire and 25% by weight, based on the total welding rod, of the coating, and further on the assumption that the ratios of carbon, manganese, chromium, niobium, silicon and iron transferred from the flux to the deposited metal are 50%, 80%, 80%, 60%, 60%, and 90%, respectively.

The effects attained by each of alloy-constituting elements will now be described.

Nickel occupies the greater portion of the composition and is necessary to attain low temperature toughness in the as-welded state. It is indispensable that the amount of nickel should be at least 45%. If the nickel content is lower than 45%, good low temperature toughness cannot be obtained.

Chromium forms a solid solution with nickel to strengthen the matrix, and improves the tensile strength to a slight degree. It also acts to improve the low temperature toughness. Thus, chromium is added in an amount of not more than 30%. If it exceeds this amount, the low temperature toughness will be greatly reduced by the addition of other elements which are effective for increasing the tensile strength.

If the composition contains less than 5% of manganese, and the difference is made up by increased quantities of niobium, the niobium will increase the tensile sgrength, but there will also be a tendency for the low temperature toughness to be abruptly decreased.

However, it has now been found that in compositions containing manganese in an amount of at least 5%, any increase in the niobium content will result in improving the tensile strength with only a very little decrease in low temperature toughness.

Manganese alone however, will not improve the mechanical properties of the alloy although it does exhibit a valuable effect in retarding the degradation of the low temperature toughness. Such effect cannot be attained if the manganese content is less than 5%. However, the use of greater than 12% manganese will not enhance the above effect particularly, but will result in poor workability in welding. Thus, manganese should be used in amounts of from 5% – 12%.

Niobium, in combination with manganese, can conspicuously improve the tensile strength and it exhibits a valuable effect in increasing the crack resistance of the deposited metal. For this reason, it may be incorporated in an amount of at least 4%. Less than 4% will be insufficiently effective for enhancing tensile strength and crack sensitivity. If the niobium content is greater than 8%, the tensile strength will become too high and the low temperature toughness will be greatly reduced.

Carbon and/or iron may be optionally added for specialty purposes.

Incorporation of a small amount of carbon will effectively improve the tensile strength but the low temperature toughness will be degraded to a large extent and crack sensitivity will be increased. Therefore, the carbon content should be not more than 0.2%.

Iron will increase slightly the tensile strength, but will tend to reduce low temperature toughness. However, since the degree of this adverse effect is not significant, it may be used in amounts of not more than 22%.

As described above, the objects of this invention can be attained by the use of a flux of lime or lime-titania. If the manganese content is increased in the nickel-base alloy composition, as in this invention, the deposited metal will become less "compatible" with the base metal and a slag will tend to be "burnt" which will be included into the deposited metal with the result that workability in the welding operation will be reduced.

This defect can be overcome however by this invention, and good workability can be imparted to a high-manganese nickel-base alloy welding rod.

The flux according to this invention comprises, on the weight basis, 10 – 15% calcium carbonate, 16 – 50% fluorspar, 2 – 20% magnesia clinker and up to 10% rutile. An especially preferable flux is one containing magnesia clinker and having a ratio of fluorspar to calcium carbonate within the range of from 1 to 1.5.

Not more than 60% of ingredients of such flux may be substituted by a deoxidizing agent, an alloy-constituting element or the like.

Each of the ingredients of the flux will now be described.

Calcium carbonate not only increases the basicity of slag but also shields the molten pool from air by generating $CO_2$ during welding. It also forms CaO during welding which becomes incorporated into the slag to make it easily crumbling. It may be used, therefore, in amounts of 10 – 50%. If the calcium carbonate content is below 10%, the molten pool will not be shielded resulting in the formation of such defects as blowholes. If the calcium carbonate content exceeds 50%, the amount of $CO_2$ gas generated during welding will be excessive and the arc will be unstable. Accordingly, a calcium carbonate content exceeding 50% is not preferred.

The presence of CaO during welding, however, does tend to degrade the compatibility of the weld metal. Therefore, it is necessary to blend the calcium carbonate with fluorspar. It has now been found that the most desirable results are obtained when the ratio of fluorspar to calcium carbonate is within the range of from 1 to 1.5.

Instead of calcium carbonate, of course, any alkaline earth metal carbonate may be used with equally good results.

Fluorspar improves the compatibility of the weld metal and the peeling property of the slag. When used, it should be incorporated in an amount of 16 – 60%. The intended effects cannot be attained if the fluorspar content is below 16%. A fluorspar content exceeding 60% will result in an unstable arc. Instead of fluorspar, of course, other fluorides may equally be used such as sodium fluoride, potassium fluoride, potassium silicofluoride, sodium silicofluoride, aluminum fluoride or any other fluoride.

Magnesia clinker will act to stabilize the arc and will form a fire resistant coating covering. Thus, it may be used in amounts of 2 – 20%. If the magnesia clinker content is below 2%, such effects cannot be attained, and the peeling property of slag will be reduced.

The flux having the above composition can provide a welding rod of good workability, although the slag-peeling properties and the arc stability will be further improved by the addition of not more than 10% rutile. When rutile is incorporated in an amount exceeding 10%, however the viscosity of slag will be increased and the bead appearance will become uneven.

In order to provide the required composition of alloy elements to the deposited metal, it is possible to substitute up to 60% of the ingredients of the flux of this invention with a metal powder. If the amount of the metal powder exceeds 60%, however, the workability during welding will be adversely affected and the objects cannot be attained.

Another embodiment of the process of preparing a welding material of this invention will now be described briefly by reference to a welding rod.

The components of the lime or lime-titania coating material and the above alloy components are blended together with water glass (an aqueous solution of a mixture of sodium silicate and potassium silicate; 10 – 20% based on the total weight of the coating material), and the resulting coating material is coated on the periphery of a core wire in an amount of 25 – 45% based on the total weight of the welding rod. The assembly is dried at 200° – 250° C. Thus, the process is not particularly different from the conventional process of preparing welding rods.

Having generally described the invention, a more complete understanding can be attained by reference to certain specific Examples, which are included herein for purposes of illustration only and are not intended to be limiting unless otherwise specified.

EXAMPLE

Welding material composition (1):
a. Chemical composition of core wire (%)

| C | Mn | Si | P | S | Cr | Nb | Fe | Ni |
|---|---|---|---|---|---|---|---|---|
| 0.05 | 10.2 | 0.42 | 0.005 | 0.006 | 18.5 | 6.0 | 11.5 | balance | b. Blending ratios of ingredients of coating material
calcium carbonate = 40%, fluorospar = 53%, rutile = 5%, ferrosilicon = 2% (silicon content = 50%)

c. Binder
Aqueous solution of mixture of sodium silicate and potassium silicate (SG 1.40)

d. Covering ratio of coating material
25% based on the total weight of the welding rod Welding material composition (2)
a. Chemical composition of core wire (%)

| C | Mn | Si | P | S | Cr | Nb | Fe | Ni |
|---|---|---|---|---|---|---|---|---|
| 0.06 | 1.2 | 0.55 | 0.04 | 0.006 | 14.0 | 1.5 | 7.3 | balance | b. Blending ratios of ingredients of coating material
calcium carbonate = 28%, fluorspar = 31%, rutile = 2%, magnesia clinker = 4%, metallic manganese = 15%, ferroniobium = 20 % (niobium content = 70%)

c. Binder
Aqueous solution of mixture of sodium silicate and potassium silicate (SG 1.40)

d. Covering ratio of coating material
40% based on the total weight of the welding rod Welding material composition (3)
a. Filler rod composition (%)

| C | Mn | Si | P | S | Cr | Nb | Fe | Ni |
|---|---|---|---|---|---|---|---|---|
| 0.10 | 7.0 | 0.7 | 0.05 | 0.04 | 14.0 | 6.0 | 10 | balance |

The above three welding materials (welding materials of compositions (1) and (2) are for arc welding using a coated electrode, and welding material of filler rod composition (3) is for MIG welding), and a commercially available nickel-base alloy welding rod having a composition corresponding to that of ENi-Cr-Fe 3, were subjected to tensile test, impact test and chemical analysis with respect to the as-welded deposited metal. Further, the tensile test and impact test were conducted on the weld metal in the weld zone of 9% nickel steel.

Test Results:
1. Chemical composition of the whole deposited metal:
A sample was collected according to AWS A511, and the chemical analysis was conducted to obtain the following results:

Welding rod (1) of the invention

| C | Mn | Si | P | S | Cr | Nb | Fe |
|---|---|---|---|---|---|---|---|
| 0.05 | 9.17 | 0.40 | 0.004 | 0.006 | 16.8 | 5.40 | 10.94 |

Welding rod (2) of this invention

| C | Mn | Si | P | S | Cr | Nb | Fe |
|---|---|---|---|---|---|---|---|
| 0.06 | 5.88 | 0.33 | 0.004 | 0.005 | 12.6 | 4.71 | 8.66 |

Welding rod (3) of this invention

| C | Mn | Si | P | S | Cr | Nb | Fe |
|---|---|---|---|---|---|---|---|
| 0.09 | 6.80 | 0.65 | 0.004 | 0.006 | 13.5 | 5.8 | 9.7 |

Commercially available Ni-base alloy welding rod

| C | Mn | Si | P | S | Cr | Nb | Fe |
|---|---|---|---|---|---|---|---|
| 0.03 | 6.82 | 0.52 | 0.005 | 0.004 | 13.5 | 1.72 | 9.20 |

2. Mechanical properties of the deposited metal:

The welding was conducted according to JIS Z 3221, and tensile test specimens of JIS A No. 1 and impact test specimens of JIS No. 4 were taken.

The tensile test was conducted at room temperature and the impact test was effected at −196° C.

As is apparent from the test results shown in Table 1, in welding rods of this invention, the deposited metal exhibited a tensile strength and ductility comparable to those of 9% nickel steel base, together with a sufficient low temperature toughness.

TABLE 1

|  | Tensile Strength (Kg/mm²) | Elongation (%) | Impact Value at −196° C. (Kg-m) |
| --- | --- | --- | --- |
| Welding rod (1) of this invention | 79.1 | 41 | 6.1 |
| Welding rod (2) of this invention | 80.3 | 38 | 5.7 |
| Welding rod (3) of this invention | 79.6 | 38 | 6.5 |
| Commercially available Ni-base alloy welding rod | 63.1 | 43 | 8.0 |
| 9% Ni steel standard | 70.3–84.4 | ≧22 | ≧3.5 |

3. Mechanical properties of the weld metal in the weld zone of 9% Ni steel:

9% Ni steel specified in ASTM A 553-65T (QT steel) was subjected to the groove welding, and mechanical properties of the weld metal diluted with the base metal were examined. Two sheets of a dimension of 20 mm (thickness) × 250 mm (length) × 200 mm (width were welded in a butt joint to form a test specimen.

The groove conditions were as follows: a groove angle of 60°, a root face of 0.5 mm, and a root gap of 1 mm. The surface side was metal-welded, and then the back chipping was effected, followed by one layer welding on the back.

Tensile test specimens (D : φ G.L 50 mm) were taken in a direction parallel to the welding direction. Impact test specimens were taken according to JIS Z 3111 (specimen No. 4).

The tensile test was conducted at room temperature, and the impact test was effected at −196° C.

As is apparent from the test results shown in Table 2, in welding rods of this invention, the weld metal exhibited a tensile strength comparable to that of the base metal and a sufficient low temperature toughness.

TABLE 2

|  | Tensile Strength (Kg/mm²) | Elongation (%) | Impact Value at −196° C. (Kg-m) |
| --- | --- | --- | --- |
| Welding rod (1) of this invention | 77.6 | 42 | 6.3 |
| Welding rod (2) of this invention | 78.5 | 39 | 5.9 |
| Welding rod (3) of this invention | 76.3 | 38 | 6.0 |
| Commercially available Ni-base alloy welding rod | 61.3 | 43 | 9.5 |
| 9% Ni steel standard | 70.3–84.4 | ≧22 | ≧3.5 |

Having now fully described the invention, it will be apparent to one of ordinary skill in the art that many changes and modifications can be made thereto without departing from the spirit or scope of the invention.

What is claimed as new and desired to be secured by Letters Patent of the United States is:

1. An arc welding electrode which is applicable for low temperature steels, which comprises:

a core wire consisting essentially of no more than 0.2% carbon, 5-12% manganese, no more than 30% chromium, 4-8% niobium, no more than 22% iron and no more than 1.5% silicon, the balance being substantially nickel and extraneous impurities, covered with a flux consisting essentially of 10-50% calcium carbonate, 16-50% fluorspar, 2-20% magnesia clinker and no more than 10% rutile, wherein the ratio of fluorspar to calcium carbonate is in the range of 1-1.5.

2. An arc welding electrode which is applicable for low temperature steels, which comprises:

a composite wire composed of a metal casting packed with an alloy powder consisting essentially of no more than 0.2% carbon, 5-12% manganese, no more than 30% chromium, 4-8% niobium, no more than 22% iron and no more than 1.5% silicon with the balance being substantially nickel and extraneous impurities, together with a flux consisting essentially of 10-50% calcium carbonate, 16-50% fluorspar, 2-20% magnesia clinker and no more than 10% rutile, wherein the ratio of fluorspar to calcium carbonate is within the range of 1-1.5.

* * * * *

UNITED STATES PATENT OFFICE
CERTIFICATE OF CORRECTION

PATENT NO. : 3,853,611
DATED : December 10, 1974
INVENTOR(S) : TOMOKAZU GODAI ET AL It is certified that error appears in the above-identified patent and that said Letters Patent are hereby corrected as shown below:

Column 4, line 38, cancel "10-15%" and insert --10-50%--.

Signed and Sealed this fourth Day of November 1975

[SEAL]

Attest:

RUTH C. MASON
*Attesting Officer*

C. MARSHALL DANN
*Commissioner of Patents and Trademarks*